(12) United States Patent
    Arastafar

(10) Patent No.: US 12,432,813 B2
(45) Date of Patent: Sep. 30, 2025

(54) METHOD AND SYSTEM FOR CONNECTING HEADSET TO DEVICE WITH ACTIVE SESSION

(71) Applicant: RingCentral, Inc., Belmont, CA (US)

(72) Inventor: Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 466 days.

(21) Appl. No.: 18/090,946

(22) Filed: Dec. 29, 2022

(65) Prior Publication Data

US 2024/0224383 A1   Jul. 4, 2024

(51) Int. Cl.
    *H04W 76/30* (2018.01)
(52) U.S. Cl.
    CPC ................... *H04W 76/30* (2018.02)
(58) Field of Classification Search
    CPC ...................................... H04W 76/30
    See application file for complete search history.

(56) References Cited

U.S. PATENT DOCUMENTS

| | | | |
|---|---|---|---|
| 2005/0170859 A1* | 8/2005 | Koike | H04W 88/04 455/556.1 |
| 2012/0238215 A1* | 9/2012 | Kari | H04M 1/6066 455/41.3 |
| 2016/0323699 A1* | 11/2016 | Kim | H04M 1/72412 |
| 2017/0208639 A1* | 7/2017 | Lee | H04W 4/80 |
| 2019/0238596 A1* | 8/2019 | Jepsen | H04L 65/403 |
| 2020/0128620 A1* | 4/2020 | Han | H04W 4/20 |
| 2021/0264913 A1* | 8/2021 | Schramm | H04M 3/42263 |

\* cited by examiner

Primary Examiner — Will W Lin

(57) ABSTRACT

The present disclosure provides a computer-implemented method for connecting peripheral units to user devices. The method comprises detecting a communication via a first user device connectable to a peripheral unit; detecting a connection intent of the peripheral unit to connect to a second user device; and sending, to the second user device, a command to suppress a connection with the peripheral unit.

20 Claims, 7 Drawing Sheets

METHOD AND SYSTEM FOR CONNECTING HEADSET TO DEVICE WITH ACTIVE SESSION

TECHNICAL FIELD

The present disclosure relates generally to the field of computer-supported communications. specifically, the present disclosure relates to systems and methods for connecting a headset to the device with an active communication session.

BACKGROUND

Computer-supported communications have gotten more popular during the past several years. For example, the COVID-19 pandemic has had a significant impact on the popularity of computer-supported communications. As a result of the pandemic, many businesses were pushed to perform as much work as possible remotely. This challenge presented the problem of how employees could effectively communicate with each other despite remote work. Consequently, the use of audio and video meeting services increased dramatically. Since an employee is able to digitally connect to meetings using only a laptop or smartphone, communications between employees could be carried out at any time regardless of their location.

Working remotely presents its own difficulties. Environmental noises could distract a meeting participant who is trying to join from in a noisy environment like an open coworking space, café, or restaurant. Using embedded speakers might disturb the comfort of other people such as relatives or roommates for individuals working from home. Additionally, privacy is important while participating in a confidential meeting featuring sensitive topics, since everyone within proximity may hear what is being discussed at the meeting through the speakers. To address these problems, participants usually use earphones, headsets, or a device that could be generalized by the term "personal audio device". Thus, a person could utilize a number of user devices (like a laptop or smartphone) with a number of personal audio devices. In a particular example, a user may activate one personal audio device using Bluetooth® connectivity for use during a current conference from a laptop, but upon activating the Bluetooth® connection, the user may realize that the personal audio device is connected to a smartphone, from which user was participating in a previous meeting. The user faces the challenge of disconnecting the personal audio device from the smartphone used in the previous meeting and connecting it to the laptop used in the current meeting.

SUMMARY

The appended claims may serve as a summary of the invention.

DETAILED DESCRIPTION

Figure 1:
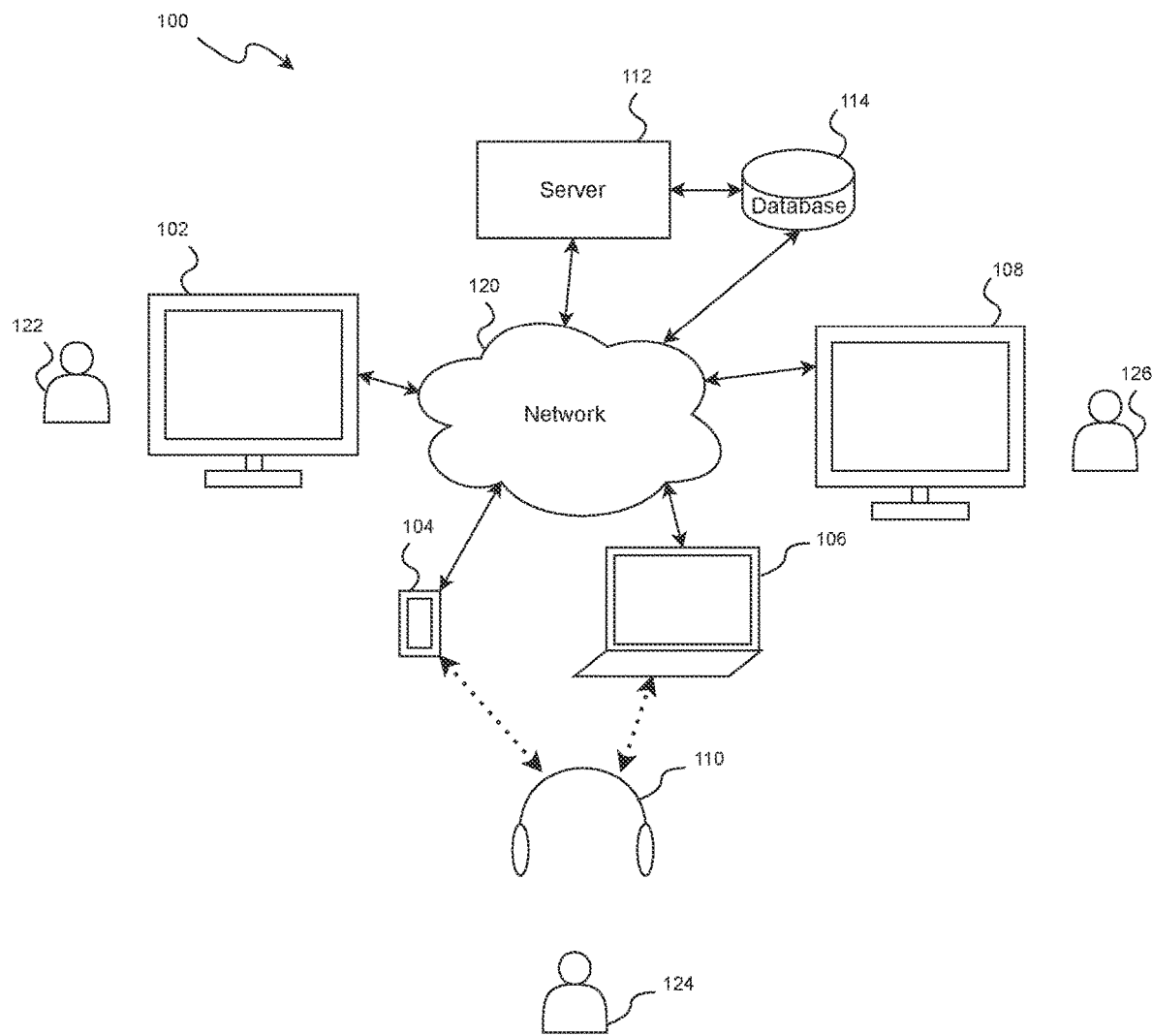
FIG. 1 is a diagram of a collaboration system, according to an example embodiment of the present disclosure.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IOT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:
1.0 GENERAL OVERVIEW
2.0 STRUCTURAL OVERVIEW
3.0 FUNCTIONAL OVERVIEW
4.0 PROCEDURAL OVERVIEW 1.0 General Overview The current disclosure provides a technological solution to the technological problem of connecting wireless devices to a host device with an active communication session. Peripheral wireless devices, like headsets, have a number of instructions which, upon the peripheral unit activation, instruct the peripheral unit to connect to the last user device to which it was connected. To some extent, these instructions make the usage of such peripheral units easier for users who want to reconnect to the same user device. However, these instructions cause problems when a user uses more than one user device. Users may expect the peripheral unit to connect to a current user device that is actively being used, while the instructions of the peripheral unit stipulate that the peripheral unit should connect to the last connected user device. This problem may be exacerbated when a user utilizes a number of user devices along with a number of peripheral units. In this scenario, the peripheral unit will often connect to whichever user device was last used instead of the device that has an active communication session. The problem is more pronounced in cases where the peripheral unit needs to be connected to a particular user device for a short period of time only, such as when the user is engaged in a short call, but needs reconnect to another user device after the short call has ended.

The current solution solves these problems by providing an efficient solution for connecting peripheral units to user devices. In one aspect of the present disclosure, a computer-implemented method for connecting peripheral units to user devices is proposed. The method comprises the steps of: causing to detect a communication via a first user device connectable to a peripheral unit; causing to detect a connection intent of the peripheral unit to connect to a second user device; and causing to send, to the second user device, a command to suppress a connection with the peripheral unit. Therefore, the current solution provides the technological benefit of an automated suppression of undesired connections while facilitating faster connections to the desired user device with an active communication session.

In one embodiment of the present disclosure, the first user device and the second user device use a user profile associated with a user.

In another embodiment of the present disclosure, the method further comprises the step of causing to detect network conditions for the first user device and the second user device.

In another embodiment of the present disclosure, the method further comprises the step of causing to detect network conditions for the first user device and the second user device.

In another embodiment of the present disclosure, the method further comprises the step of causing to detect if the communication is an encrypted communication.

In another embodiment of the present disclosure, the communication is an incoming audio or video call or an outgoing audio or video call.

In another embodiment of the present disclosure, the peripheral unit is a headset, headphones or speaker.

In yet another embodiment of the present disclosure, the command to suppress the connections includes a command to turn off Bluetooth® connectivity.

According to a second aspect of the present disclosure, a non-transitory, computer-readable medium connecting peripheral units to user devices is proposed. The medium stores a set of instructions that, when executed by a processor, cause the following: detecting a communication via a first user device connectable to a peripheral unit; detecting a connection intent of the peripheral unit to connect to a second user device; and sending, to the second user device, a command to suppress a connection with the peripheral unit.

According to a third aspect of the present disclosure, a system connecting peripheral units to user devices is provided, the system comprises a processor; a memory operatively connected to the processor and storing instructions that, when executed by the processor, cause: detecting a communication via a first user device connectable to a peripheral unit; detecting a connection intent of the peripheral unit to connect to a second user device; and sending, to the second user device, a command to suppress a connection with the peripheral unit.

2.0 Structural Overview

FIG. 1 shows a diagram of an example collaboration system suitable for realization of one of the embodiments of the current disclosure.

The collaboration system 100 facilitates communications between user devices 102, 104, 106, and 108 associated with corresponding users 122, 124, and 128 and a server 112. Network 120 may be any type of networks that provides communications or facilitates the exchange of information between the server 110 and user devices 102, 104, 106, and 108. For example, network 120 broadly represents a one or more local area networks (LANs), wide area networks (WANs), metropolitan area networks (MANs), global interconnected internetworks, such as the public internet, or other suitable connection(s) or combination thereof that enables collaboration system 100 to send and receive information between the user devices 102, 104, 106, and 108 and the server 110. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats, and may further support a variety of services and applications for user devices 102, 104, 106, and 108.

In particular, user devices 102, 104, 106, and 108 may be the desktop user service 102, and 108 or laptop, e.g., user device 106, executing any of known operational environment, e.g., MS Windows, MacOS, Linux or Unix. At the same time, other user devices 102, 104, 106, and 108 may be the mobile telephones, such as smartphone devices, e.g., user device 104, executing any of known operational environment, e.g., Android OS or iOS.

On the user side, user 124 has two devices connected to the network 120—user device 104 and user device 106. User 124 also has a peripheral unit 110 which could be connected wirelessly to both user devices 104 and 106. In a particular non-limiting example user device may be a wireless headset that the user utilizes in order to communicate with other participants in a communication session.

Figure 2:
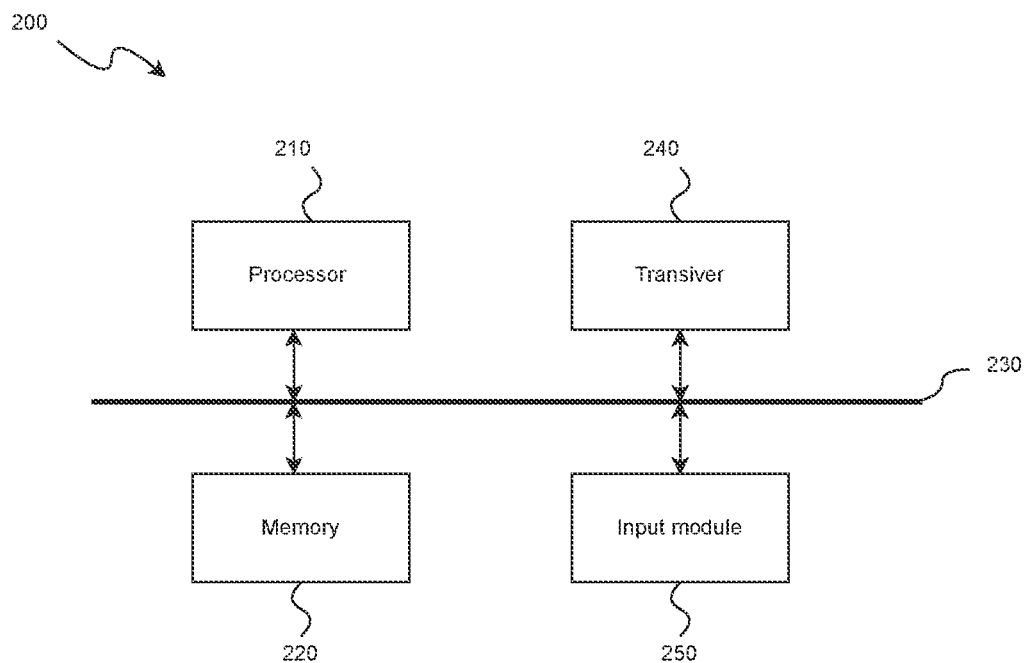
FIG. 2 is a diagram of a peripheral unit, according to an example embodiment of the present disclosure.

FIG. 2 presents a block diagram representation of wireless handset 200 in accordance with an embodiment of the present invention. In particular, wireless handset 200 includes a processor 210 and memory 220 that communicate via bus 230. In an embodiment of the present invention, processor 210 includes a processor for executing a series of operational instructions such as system programs, application programs, and other routines.

The processor 210 can be implemented using a dedicated or shared microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the processor 210 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory 220 stores, and the processor 210 executes, operational instructions corresponding to at least some of the steps and/or functions illustrated herein.

The memory 220 may be a single memory device or a plurality of memory devices. Such a memory device may be a read-only memory, random access memory, volatile memory, non-volatile memory, static memory, dynamic memory, flash memory, cache memory, and/or any device that stores digital information.

In addition, the wireless handset 200 includes a transceiver 240 for a wireless connection with a user device (like the user devices 104 and 106 of FIG. 1). In particular, transceiver 240 can receive data from the processor 210 that is converted into a radio frequency (RF) signal for communication with the user device in wireless communication therewith. In addition, RF signals received from the user device are converted to data that is transmitted to the processor 210. In an embodiment of the present invention, the transceiver 240 operates in accordance with a Bluetooth® specification, such as one or more of the specifications set forth by the Bluetooth® special interest group. However, in alternative embodiments, other short range, mid range or long range wireless protocols such as an 802.11 protocol, UWB or Wimax® protocol can also be used. In some embodiments, the transceiver 240 may comprise a number of transceivers operating in accordance with different protocols.

The wireless handset 200 includes an input module 250 for placing the wireless handset 200 in one or more operating modes. In a particular example, the input module 250 may be one or more buttons or a touch interface to let the user interact or control the functionality of the wireless headset.

In an embodiment of the present invention, memory 220 stores instruction for implementing the method herein. The memory 220 may additionally store a digitally formatted file such as a compressed or uncompressed audio file (e.g., MP3, WMA, AAC), digital video files (such as MPEG4, MPEG4 part 10, or VC1 files) that include program content such as a song, audio book, audio clip, video clip, movie, photo, television show, or other audio, video or multimedia content.

Each of these components of the wireless handset 200 may be implemented in hardware, firmware, software or a combination thereof.

While the peripheral unit is disclosed to be a wireless headset in this embodiment, it would be obvious to these skilled in the art that the peripheral unit is not limited to a wireless headset. It should be appreciated that in other embodiments the peripheral unit may be a head-mounted display (HMD) (like Oculus Quest®) for participation in Virtual Reality (VR) communication, smartglasses (like Google Glass®) for augmented reality (AR) communications, smartwatch (like Apple Watch®) or smartband (like Pebble®) for audio/video communications.

Figure 3:
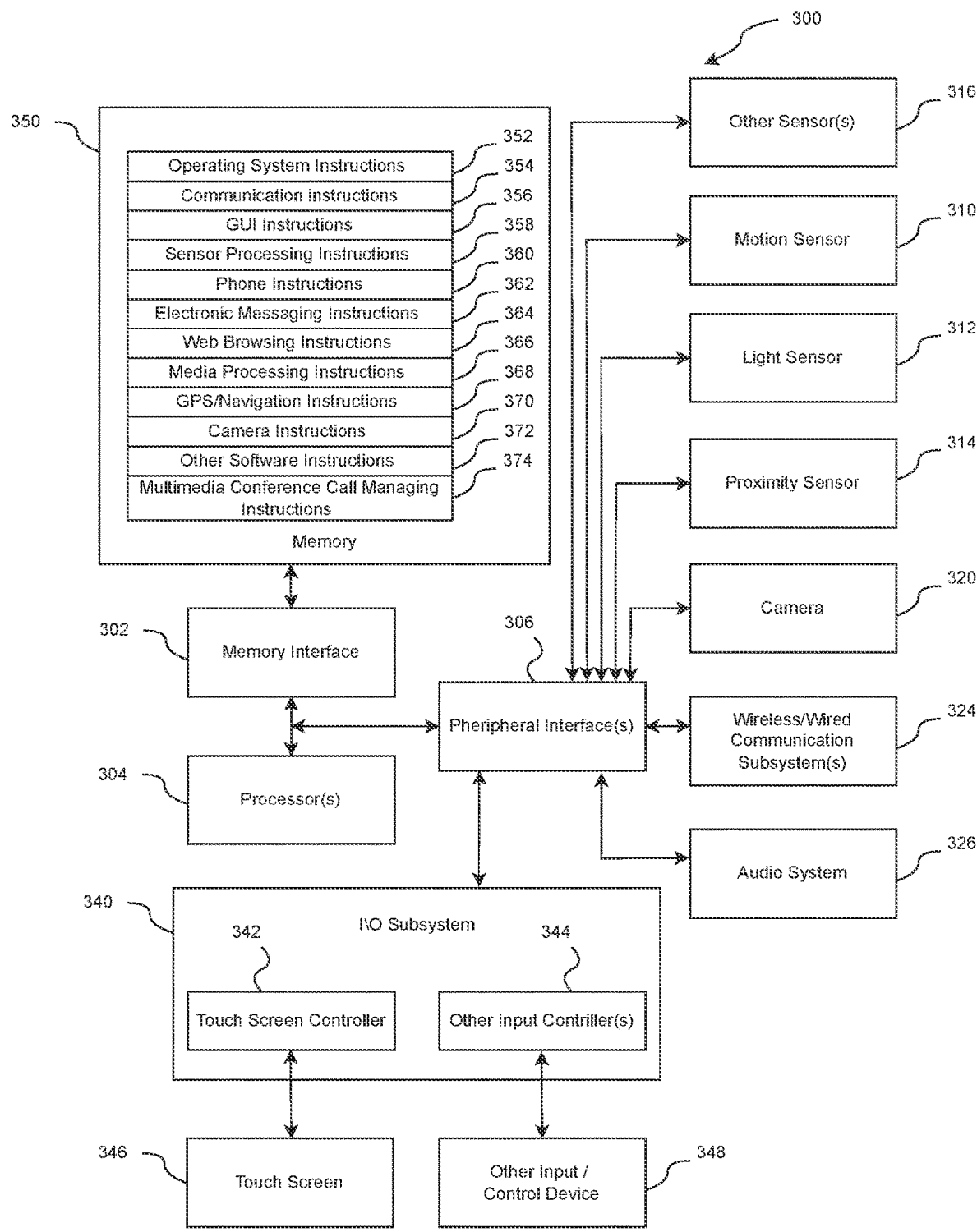
FIG. 3 is a diagram of a user device, according to an example embodiment of the present disclosure.

FIG. 3 is a diagram of an example of a user device 300 for use in a collaboration system, such as collaboration system 100. The user device 300 can be used to implement computer programs, applications, methods, processes, or other software to perform embodiments described in the present disclosure, such as the user devices 102, 104, 106, and 108. The user device 300 includes a memory interface 302, one or more processors 304 (which could be implemented as the processor 201 of the peripheral unit 200) such as data processors, image processors and/or central processing units, and a peripherals interface 306. The memory interface 302, the one or more processors 304, and/or the peripherals interface 306 can be separate components or can be integrated in one or more integrated circuits. The various components in the user device 300 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 206 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities. A GPS receiver can be integrated with, or connected to, the user device 300. For example, a GPS receiver can be built into mobile telephones, such as smartphone devices, e.g., user device 104, or into laptop, e.g., user device 106. GPS software allows mobile telephones to use an internal or external GPS receiver (e.g., connecting via a serial port or Bluetooth®). A camera subsystem 320 and an optical sensor 322, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 324, which includes an Ethernet port, radio frequency receivers and transmitters and/or optical (e.g., infrared) receivers and transmitters. The specific design and implementation of the wireless/wired communication subsystem 324 depends on the communication network(s) over which the user device 300 is intended to operate. For example, in some embodiments, the user device 300 includes wireless/wired communication subsystems 324 designed to operate over a GSM network, a GPRS network, an EDGE network, a Wi-Fi® or WiMax® network, and a Bluetooth® network. In an embodiment, the wireless/wired communication subsystem is used to communicate via a Bluetooth® connection with the wireless headset 200.

An audio subsystem 326 may be coupled to a speaker 328 and a microphone 330 to facilitate voice-enabled functions, such as voice recognition, voice replication, digital recording, and telephony functions.

The I/O subsystem 340 includes a touch screen controller 342 and/or other input controller(s) 344. The touch screen controller 342 is coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346. While a touch screen 346 is shown in FIG. 3, the I/O subsystem 340 may include a display screen (e.g., CRT or LCD) in place of the touch screen 346.

The other input controller(s) 344 is coupled to other input/control devices 348, such as one or more buttons, rocker switches, thumb-wheel, infrared port, USB port, and/or a pointer device such as a stylus. The touch screen 346 can, for example, also be used to implement virtual or soft buttons and/or a keyboard.

The memory interface 302 is coupled to memory 350. The memory 350 includes high-speed random access memory and/or non-volatile memory, such as one or more magnetic disk storage devices, one or more optical storage devices, and/or flash memory (e.g., NAND, NOR). The memory 350 stores an operating system 352, such as DRAWIN, RTXC, LINUX, iOS, UNIX, OS X, WINDOWS, or an embedded operating system such as VXWorkS. The operating system 352 can include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/navigation instructions 368 to facilitate GPS and navigation-related processes and instructions; camera instructions 370 to facilitate camera-related processes and functions; and/or other software instructions 372 to facilitate other processes and functions. The memory 350 may also include multimedia conference call managing instructions 374 to facilitate conference call related processes and instructions.

In some embodiments, the communication instructions 354 represent or include software applications to facilitate connection with the collaboration server 112 that connects plurality of user devices. The electronic messaging instructions 362 may include a software program to generate communication requests to the collaboration server 112 for carrying out communications. Further, the electronic messaging instructions 362 may include software applications to receive communication requests from the collaboration server 112. The graphical user interface instructions 356 may include a software program that facilitates display of the communication notifications to a user associated with the user device and facilitates the user to provide user input, and so on.

In the presently described embodiment, the instructions cause the processor 304 to perform one or more functions of the disclosed methods. For example, the instructions may cause the wireless communication subsystem(s) 324 to connect with a peripheral unit (like wireless headset 110 of FIG. 1). In some embodiments, the instructions may cause the processors 304 to communicate an audio stream to the peripheral unit via the wireless communication subsystem(s) 324.

Each of the above identified instructions and software applications may correspond to a set of instructions for performing one or more functions described above. These instructions may be implemented as separate software programs, procedures, or modules. The memory 350 may include additional instructions or fewer instructions. Furthermore, various functions of the user device 300 may be implemented in hardware and/or in software, including in one or more signal processing and/or application specific integrated circuits.

The user device 300 of FIG. 3 or the user devices 102, 104, 106, and 108 of FIG. 1 may execute various applications stored in the memory 350. In one embodiment, the application may be a collaboration application or any other suitable client application for carrying out calls or participate in conferences.

Figure 4:
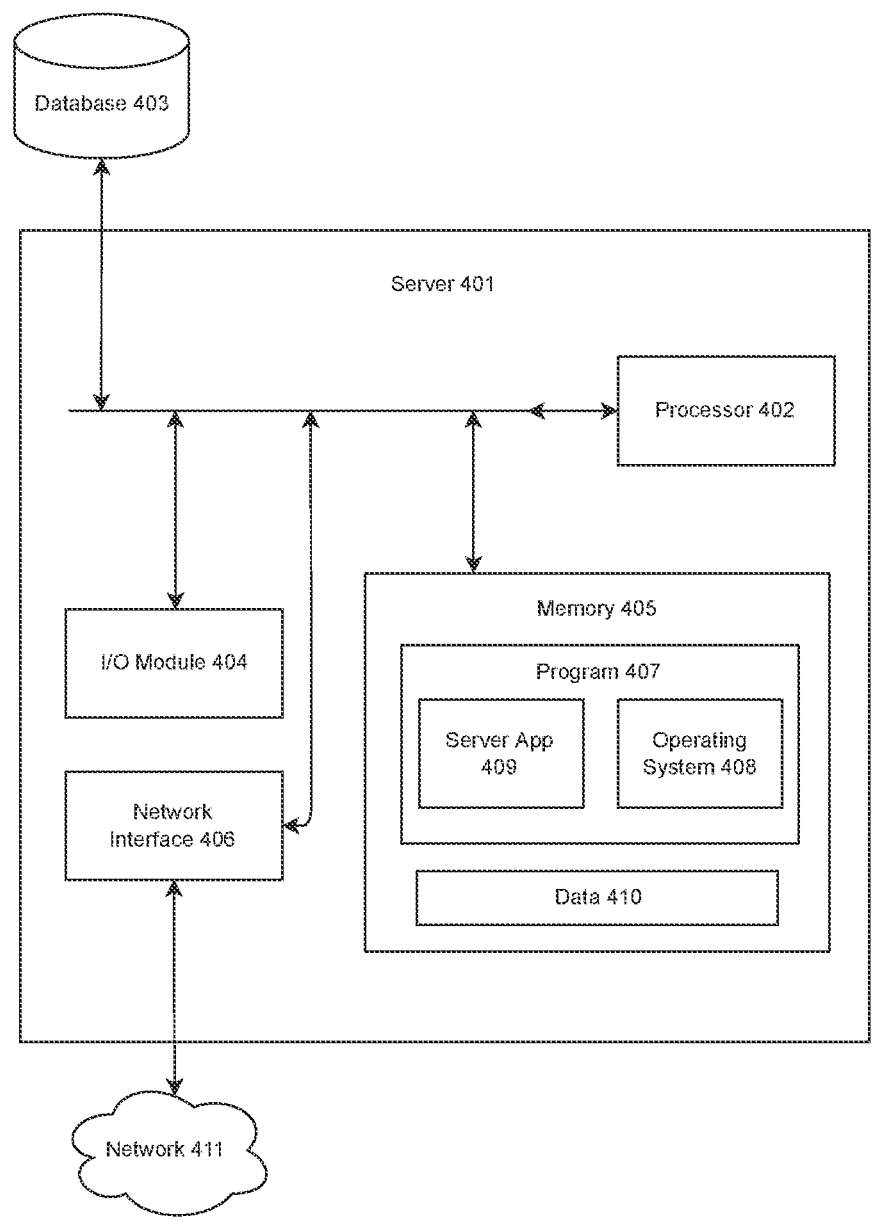
FIG. 4 is a diagram of a server, according to an example embodiment of the present disclosure.

FIG. 4 is a block diagram that illustrates an example of a server 401 suitable for implementing the disclosed systems and methods. The server 401 may represent a collaboration server 112 of FIG. 1. The server 401 may include at least one processor, e.g., processor 402. The processor 402 may be operably connected to one or more databases (e.g., database 403), an input/output module 404, memory 405, and network interface device 406.

I/O module 404 may be operably connected to a keyboard, mouse, touch screen controller, and/or other input controller(s) (not shown). Other input/control devices connected to I/O module 404 may include one or more touchpads, trackballs, buttons, rocker switches, thumb-wheel, infrared port, USB port, and/or a pointer device such as a stylus.

Processor 402 may also be operably connected to memory 405. Memory 405 may include high-speed random access memory and/or non-volatile memory, such as one or more magnetic disk storage devices, one or more optical storage devices, and/or flash memory (e.g., using NAND, NOR gates).

Memory 405 may include one or more programs 407. For example, memory 405 may store an operating system 408, such as DRAWIN, RTXC, LINUX, iOS, UNIX, OS X, WINDOWS, or an embedded operating system such as VXWorkS. Operating system 408 may include instructions for handling basic system services and for performing hardware dependent tasks. In some implementations, operating system 408 may comprise a kernel (e.g., UNIX kernel).

Memory 405 may also store one or more server applications 409 to facilitate communicating with one or more additional devices, one or more computers and/or one or more servers. Server applications 409 may also include instructions to execute one or more of the disclosed methods.

Memory 405 may also store data 410. Data 401 may include transitory data used during instruction execution. Data 401 may also include data recorded for long-term storage.

Each of the above identified instructions and applications may correspond to a set of instructions for performing one or more functions described above. These instructions need not be implemented as separate software programs, procedures, or modules. Memory 405 may include additional instructions or fewer instructions. Furthermore, various functions of server 401 may be implemented in hardware and/or in software, including in one or more signal processing and/or application specific integrated circuits.

Communication functions may be facilitated through one or more network interfaces (e.g., interface 406). Network interface 406 may be configured for communications over Ethernet, radio frequency, and/or optical (e.g., infrared) frequencies. The specific design and implementation of network interface 406 depends on the communication network(s) over which server 401 is intended to operate. For example, in some embodiments, server 401 includes wireless/wired network interface 406 designed to operate over a GSM network, a GPRS network, an EDGE network, a Wi-Fi® or WiMax® network, and a Bluetooth® network. In other embodiments, server 401 includes wireless/wired network interface 406 designed to operate over a TCP/IP network. Accordingly, network 311 may be any appropriate computer network compatible with network interface 406.

The various components in server 401 may be coupled by one or more communication buses or signal lines (not shown).

3.0 Functional Overview

Figure 5:
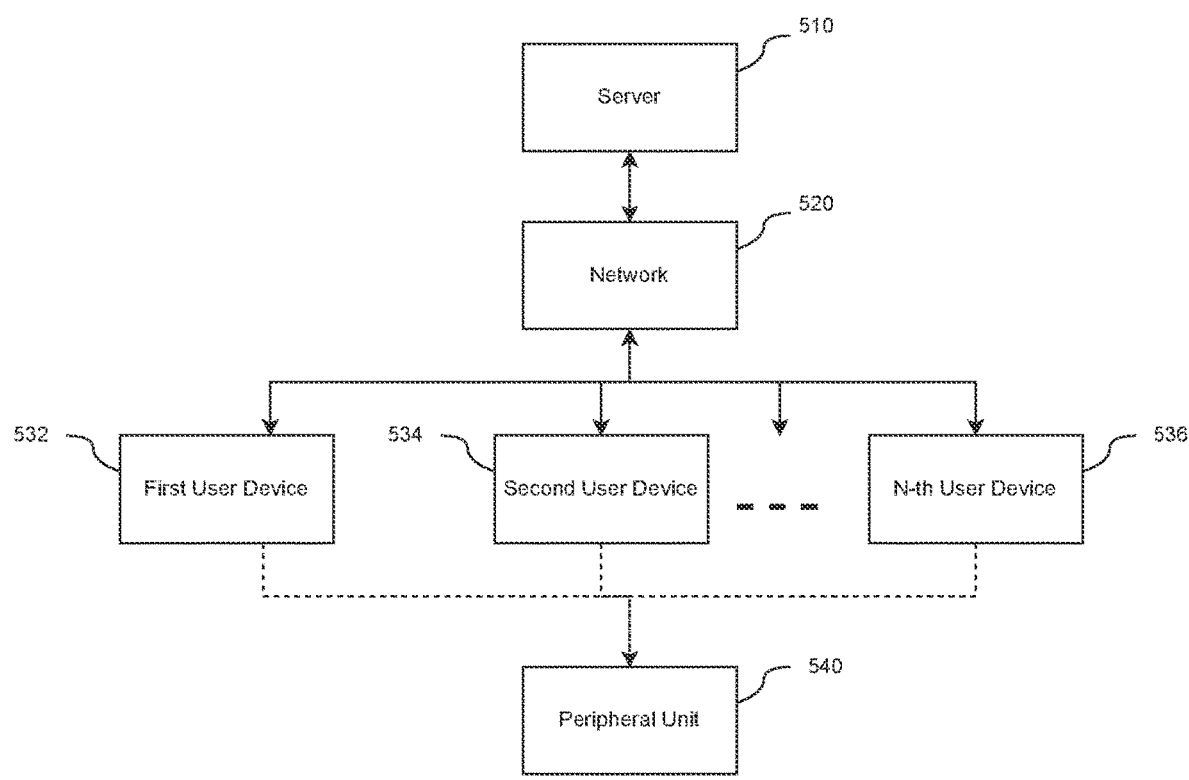
FIG. 5 is a diagram of a system, according to an example embodiment of the present disclosure

FIG. 5 shows a diagram of communications between user devices, a server and a peripheral unit according to one embodiment of the current disclosure. Server 510 may represent the server 112 of FIG. 1, and be used to establish communication between various clients in a collaboration system (like collaboration system 100 of FIG. 1) over the network 520 (like the network 120 of FIG. 1. User may use a first user device 532 a second user device 534 and Nth user device 536 to participate in communication sessions. The Nth user device 536 represents any number of user devices for the purpose of the current disclosure. The first user device 532, the second user device 534 or the Nth user device 536 may be one of the user devices 102, 104, 106 and 108 of FIG. 1. Each one of the first user device 430, the second user device 532 and the Nth user device 534 might be configured to perform instructions to communicate with the server 510 via the network 520, and may represent a similar user device as the user device 300 of FIG. 3.

In order to listen to audio streams and contribute to the session, a user uses peripheral unit 540, which may be wirelessly connected to one of the first user device 532, the second user device 534 and the Nth user device 536. The peripheral unit 540 may represent the peripheral unit 200 of FIG. 2.

While the present embodiment describes a non-limiting example with an audio stream, it should be understood that in other examples, a user may participate in a video meeting and utilize the peripheral unit 540. In other embodiments, a user may participate in a meeting in a virtual environment utilizing HMD or smart glasses.

Figure 6:
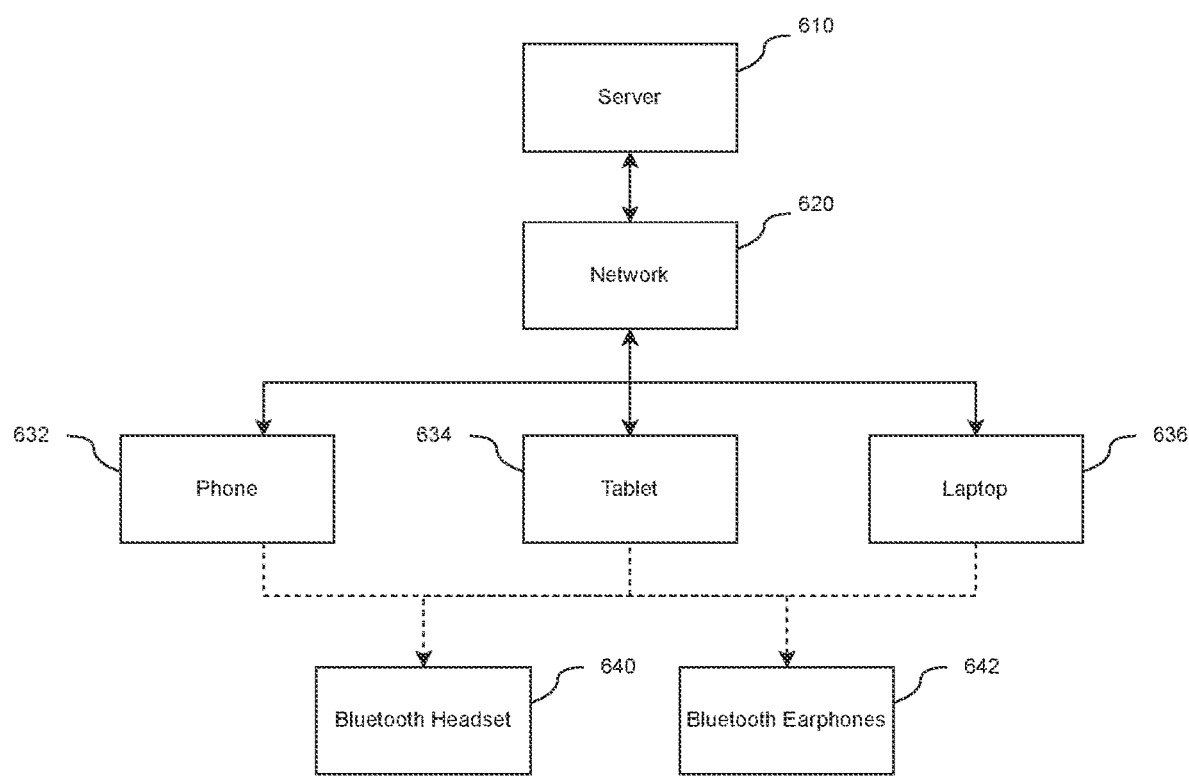
FIG. 6 is a diagram of another example embodiment of a system, according to the present disclosure.

FIG. 6 shows a diagram of communications between user devices and peripheral units for the particular embodiment of the current disclosure. In the example embodiment of FIG. 6, the user devices are represented by phone 632, table 634, and/or laptop 636. Moreover, in this embodiment, the peripheral unit is represented by Bluetooth® headset 640, which was previously connected to each one of the phone 632, the tablet 634, and the laptop 636. The term "previously connected" means that the Bluetooth® headset 640 was previously paired with the user device and both the user device and Bluetooth® headset are ready to connect upon a request from one of them to connect. In the context of the Bluetooth® connection, pairing means that both of the paired devices (e.g., the Bluetooth® headset 640 and the phone 632) were connected to each other previously and exchanged the security pairing code that allows for fast and trusted connection in the future, without setting them to connect. In such cases, when a Bluetooth® headset 640 is activated or switched on, it automatically connects to the paired device.

In the presently described embodiment, a user uses the same user profile associated with the user on all user devices. For example, the user signs in to a collaboration application installed on each of the devices using the same credentials associated with the user. In some embodiments, the credentials are stored as a part of a user profile. As the phone 632, the tablet 634, and the laptop 636 use the same user profile, the server 610 recognizes these devices as belonging to the same user.

The user may receive or initiate calls using each of the collaboration applications. As described in the previous example of FIG. 5, server 610 may represent the collaboration server 112 of FIG. 1, and be used to establish communication between various clients in a collaboration system (like collaboration system 100 of FIG. 1). In an example scenario presenting the following events, the user receives a call from a colleague within the collaboration application and decides to answer the call using his phone 632, thereby creating an active communication session between the server 610 and the phone 632. As the call is answered, the user may want to talk using his Bluetooth® headset 640. However, upon activation, the Bluetooth® headset 640 automatically connects to the last connected device, namely the laptop 636.

According to the current disclosure, the collaboration application of the laptop 636 signals to the server 610 a message indicating that the Bluetooth® headset 640 is connected to the laptop 636. The message may be signaled using any suitable protocol for establishing communications, e.g., SIP, RTC, REST or any proprietary signaling protocol.

In response to receiving the message from the laptop 636, the server 610 comprises in its memory a set of instructions to signal, to the laptop 636 and via the network 620, a message comprising commands or instructions to suppress the connection with the Bluetooth® headset 640. In particular, the commands may comprise instructions for a processor of the laptop 636 to turn off the wireless communication subsystem (e.g. the Bluetooth® module). In other embodiments, the commands may comprise instructions for the processor of the laptop 636 to drop the connection with the particular device (e.g. Bluetooth® headset 640).

According to the current disclosure, before signaling the commands to suppress the connection to the laptop 636, server 610 should also detect an active communication session for a specific user account. In the example embodiment described above, the server 610 detects the active session with the phone 632, receives the message signaled from the laptop 636, and sends the commands to suppress the connection to the laptop 636.

It is appreciated by those skilled in the art that the listed order of events is not limited to the example embodiment described above. For instance, in other embodiments, the server 610 may first receive a message indicating that there is a Bluetooth® connection between the Bluetooth® headset 640 and the laptop 636, detect the connection, then establish an active communication with the phone 632. In this embodiment, the user might listen to music from the laptop 636 using his Bluetooth® headset 640. Then the user receives a call within the collaboration application on the phone 632. In response to the establishing an active communication session between the server 610 and the phone 632, the server 610 signals a command to the laptop 636 to suppress the Bluetooth® connection between the laptop 636 and the Bluetooth® headset 640 so that the Bluetooth® headset 640 is able to connect to the phone 632. In some embodiments, the server 610 may additionally signal similar commands to suppress a Bluetooth® connection to other user devices, like the tablet 634, to ensure that the Bluetooth® headset 640 is connected to the device with an active communication session.

In yet another embodiment, the server 610 may receive information about an active communication, but not actively contribute to its establishment where the communication might be carried out by other servers or even without such an intermediary, e.g., Peer-to-Peer (P2P) communication. In this embodiment, the user device sends the information about active communication to the server 610 independently.

In one embodiment, the user may use any number of peripheral devices with any number of user devices. In this embodiment, the server 610 stores a database (like the database 403 of FIG. 4) indicating information about which user device of the number of user devices was connected to which peripheral unit in different circumstances and establishes a connection in accordance with this historical data. In a particular embodiment, in addition to the Bluetooth® headset 640, the user usually uses Bluetooth® earphones 642 to listen to a music from the laptop 636. In the case where the user receives the call on the phone 632 and then activates the Bluetooth® headset 640 to talk via the Bluetooth® headset 640, the server 610 relies on the information stored in the database and recognizes from historical data that there is no need to suppress all Bluetooth® connections to laptop 636 since the user usually receives calls from the phone 632 using the Bluetooth® headset 640. Thus, the connection between the laptop 636 and the Bluetooth® earphones 642 can remain, while the connection between the laptop 636 and the Bluetooth® headset 640 will be suppressed.

4.0 Procedural Overview

Figure 7:
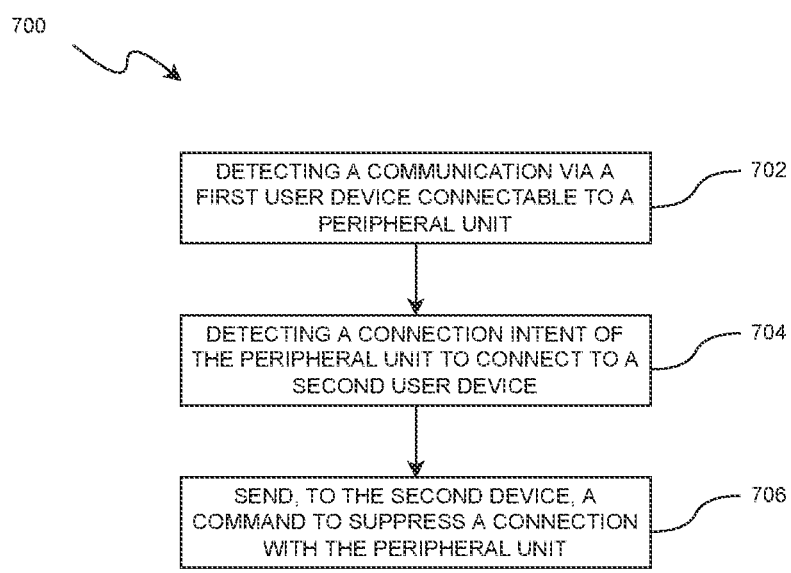
FIG. 7 is a flowchart of a method for connecting peripheral units to user devices, according to an example embodiment of the present disclosure.

FIG. 7 shows a flowchart of an example method 700 for connecting peripheral units to user devices. Method 700 may be implemented using a general-purpose computer including a processor, e.g., server 401 of FIG. 4 or user device 300 of FIG. 3. Alternatively, a special-purpose computer may be built for implementing method 600 using suitable logic elements.

At step 702, the processor detects or causes to detect a communication via a first user device connectable to a peripheral unit. The processor may be one of the processor 304 of the user device 300 of FIG. 3 or the processor 402 of the server 401 of FIG. 4. In both cases, the processors receive signals indicating that the user device 300 is engaged in an active communication session. These signals might be a result of the server 401 directly establishing the active communication session for the user device 300. Alternatively, the user device 300 may signal to the server 401 that the active communication session is established without involving the server 401. In further embodiments, the server 401 may receive these signals from other servers. The server 401 receives and/or stores information about the user device 300 and is configured to connect with the peripheral unit 200 of FIG. 2.

At step 704, the processor detects or causes to detect a connection intent of the peripheral unit to connect to a second user device. The second user device may have the same structure and functionality as the user device 300 of FIG. 3. At this stage, the processor receives signals indicating that the second user device detects an attempt from the peripheral unit 200 to connect with the second user device. The server 401 may receive these signals directly from the second user device, or from other servers. In an embodiment, the peripheral unit 200 may request a connection with the second user device. In another embodiment, the peripheral unit 200 may connect to the second user device.

At step 706, the processor sends or causes to send, to the second device, a command to suppress a connection with the peripheral unit 200. In response to receiving the signals disclosed above, the second device receives a command to suppress the connection with the peripheral unit 200. In a particular embodiment, the second user device receives a command to suppress a connection with a specific peripheral unit, or alternatively to suppress all wireless connections, e.g., turn off Bluetooth® connection.

Method 700 may include additional steps. In one embodiment, method 700 may further include a step where the processor detects or causes to detect network conditions for the first user device and the second user device. At this step, the first and second user device sends their network condition data to the server 410. In some embodiments, the network condition data is analyzed by the processor 402 in order to suppress the connection of the user device with a weaker connection.

In another embodiment, method 700 may further include a step where the processor detects or causes to detect a battery level for the first user device and the second user device. At this step, the first and second user devices send their battery levels via the network to the server 401. The battery levels are analyzed by the processor 402 in order to suppress the connection of the user device with the lower battery level.

In yet another embodiment, method 700 may further include the step at which the processor detects or causes to detect if the communication is an encrypted communication. At this step, the server 401 detects if the active communication session is an encrypted session to suppress all connections besides the secure connections to trusted devices. In an embodiment, the user may utilize special equipment to ensure a secure and spoofing-proof connection between the user devices and the peripheral units. In a particular embodiment, the user may set a secure code for the Bluetooth® connection between the phone 632 and the Bluetooth® headset 640. In response to the detection of the encrypted communication, the server 610 may send a command to suppress all other Bluetooth® connections to all of the user devices to ensure fraud protection of the call.

What is claimed is:

1. A computer-implemented method for connecting peripheral units to user devices, the method comprising:
   detecting a communication via a first user device connectable to a peripheral unit;
   detecting a connection intent of the peripheral unit to connect to a second user device; and
   sending, to the second user device, a command to suppress a connection with the peripheral unit.

2. The computer-implemented method of claim 1, wherein the first user device and the second user device use a user profile associated with a user.

3. The computer-implemented method of claim 1, further comprising detecting network conditions for the first user device and the second user device.

4. The computer-implemented method of claim 1, further comprising detecting battery levels for the first user device and the second user device.

5. The computer-implemented method of claim 1, further comprising detecting if the communication is an encrypted communication.

6. The computer-implemented method of claim 1, wherein the communication is an incoming audio or video call or an outgoing audio or video call.

7. The computer-implemented method of claim 1, wherein the peripheral unit is a headset, headphones, speaker, head-mounted display (HMD), smartglasses, smartwatch or smartband.

8. A non-transitory, computer-readable medium storing a set of instructions for connecting peripheral units to user devices that, when executed by a processor, cause:
   detecting a communication via a first user device connectable to a peripheral unit;
   detecting a connection intent of the peripheral unit to connect to a second user device; and
   sending, to the second user device, a command to suppress a connection with the peripheral unit.

9. The non-transitory, computer-readable medium of claim 8, wherein the first user device and the second user device use a user profile associated with a user.

10. The non-transitory, computer-readable medium of claim 8, wherein the instructions further comprise detecting network conditions for the first user device and the second user device.

11. The non-transitory, computer-readable medium of claim 8, wherein the instructions further comprise detecting battery level for the first user device and the second user device.

12. The non-transitory, computer-readable medium of claim 8, wherein the instructions further comprise detecting if the communication is an encrypted communication.

13. The non-transitory, computer-readable medium of claim 8, wherein the communication is an incoming audio or video call or an outgoing audio or video call.

14. The non-transitory, computer-readable medium of claim 8, wherein the peripheral unit is a headset, headphones, speaker, head-mounted display (HMD), smartglasses, smartwatch or smartband.

15. A system for connecting peripheral units to user devices, the system comprising:
   a processor;
   a memory operatively connected to the processor and storing instructions that, when executed by the processor, cause:
      detecting a communication via a first user device connectable to a peripheral unit;
      detecting a connection intent of the peripheral unit to connect to a second user device; and
      sending, to the second user device, a command to suppress a connection with the peripheral unit.

16. The system of claim 15, wherein the first user device and the second user device use a user profile associated with a user.

17. The system of claim 15, wherein the instructions further comprise detecting network conditions for the first user device and the second user device.

18. The system of claim 15, wherein the instructions further comprise detecting battery level for the first user device and the second user device.

19. The system of claim 15, wherein the instructions further comprise detecting if the communication is an encrypted communication.

20. The system of claim 15, wherein the communication is an incoming audio or video call or an outgoing audio or video call.

\* \* \* \* \*